US006136456A

United States Patent [19]

Komatsubara et al.

[11] Patent Number: 6,136,456

[45] Date of Patent: Oct. 24, 2000

[54] GRAIN ORIENTED ELECTRICAL STEEL SHEET AND METHOD

[75] Inventors: Michiro Komatsubara; Hiroi Yamaguchi; Minoru Takashima; Mineo Muraki, all of Okayama, Japan

[73] Assignee: Kawasaki Steel Corporation, Japan

[21] Appl. No.: 09/177,476

[22] Filed: Oct. 23, 1998

[30] Foreign Application Priority Data

Oct. 28, 1997 [JP] Japan .................................... 9-311167

[51] Int. Cl.[7] .............................. B32B 15/00; H01F 1/04; C25D 7/00

[52] U.S. Cl. .......................... 428/667; 148/100; 148/110; 148/518; 148/307; 148/308; 205/271; 205/283; 205/300; 205/305; 428/611; 428/612; 428/632; 428/648; 428/659; 428/679; 428/684; 428/687; 428/469; 428/472

[58] Field of Search .................................... 428/667, 679, 428/659, 648, 684, 469, 472, 611, 612, 687, 632; 336/219, 234; 420/117; 148/518, 110, 100, 307, 308; 205/271, 283, 300, 305

[56] References Cited

U.S. PATENT DOCUMENTS

| | | | |
|---|---|---|---|
| 5,173,129 | 12/1992 | Nishiike et al. | 148/308 |
| 5,571,342 | 11/1996 | Komatsubara et al. | 148/308 |
| 5,718,775 | 2/1998 | Komatsubara et al. | 148/308 |

*Primary Examiner*—Deborah Jones
*Assistant Examiner*—Robert R. Koehler
*Attorney, Agent, or Firm*—Austin R. Miller

[57] ABSTRACT

Grain oriented electrical steel sheet with a very low iron loss and a method for producing the same, wherein the surface of the iron substrate of the grain oriented electrical steel sheet is subjected to an enhancement treatment of crystal grain orientation or surface smoothing to a mean roughness of about 0.20 μm or less, electroplating a chromium plating layer on the substrate with heterogeneous growth, and applying a tension coating film to the plating layer.

18 Claims, 2 Drawing Sheets

GRAIN ORIENTED ELECTRICAL STEEL SHEET AND METHOD

BACKGROUND OF THE INVENTION

1. Field of the Invention

The present invention relates to a grain oriented electrical steel sheet, particularly to a grain oriented electrical steel sheet having tenacious adhesion to tension coating films and having a very low iron loss. The invention further relates to a novel method for producing the same.

2. Description of the Related Art

Grain oriented electrical steel sheets that contain Si, and which have crystal grains that align to the (110) [001] or (100) [001] orientations are widely used as iron core materials. They are often used in the commercial frequency region. The steel sheets have excellent soft magnetic characteristics.

It is important for this kind of steel sheet to have a low iron loss $W_{17/50}$ when it is magnetized to 1.7T at a frequency of 50 Hz or 60 Hz.

Many methods of making electrical steel sheets are known in the art. These include enhancing electrical resistance by causing Si to be present, decreasing the thickness of the steel sheet, lowering the eddy current loss by diminishing the crystal grain size, and lowering the hysteresis loss by aligning effective crystal orientation. It is additionally known to apply tension material to the steel sheet surface.

Of the methods cited above, the presence of Si may cause an increase of the iron core value, because of decreased saturation magnetic flux density, when the Si content becomes too large. Decreasing sheet thickness may result in extremely high production cost. Although a magnetic permeability of 1.96T or 1.97T can be obtained at a magnetic flux density $B_8$ by aligning the crystal grain orientation, thereby reducing the iron loss, further improvements are needed, but are almost beyond expectation.

Technologies have been developed involving artificial refinement of the magnetic domain width on the steel to reduce iron loss. These technologies include introducing local strains by irradiating the steel sheet surface with a plasma jet or a laser beam, or forming grooves on the steel sheet surface. Although the iron loss has been reduced by applying these technologies, the extent of the reducing is limited.

Smoothing the surface of the electrical steel sheet, to reduce pinning sites that inhibit movement of magnetic domain walls in the vicinity of the steel sheet surface during the magnetization process, has been disclosed. For example, Japanese Examined Patent Publication No. 52-24499 discloses a method for removing surface products by pickling with an acid after final annealing, followed by mirror-finishing the surface by chemical or electrolytic polishing to reduce the roughness of the interface between the steel sheet surface and the non-metallic coating film. Japanese Unexamined Patent Publication No. 5-43943 discloses subjecting the steel sheet to thermal etching in $H_2$ gas at a temperature of 1000 to 1200° C. after removing forsterite films.

Japanese Examined Patent Publication Nos. 4-9041, 5-87597 and 6-37694 disclose reducing the iron loss by enhancement treatment of crystal grain orientation in order to cause crystal grains of a specific orientation to remain on the metal surface, thereby reducing the iron loss of the material.

In order to obtain reduced iron loss by use of any of the methods set forth above, it is inevitable to apply a strong tension film to the surface of the steel sheet. When no tension film is present, the steel sheet surface becomes so smooth that enlargement of the magnetic domain width is accelerated. This results in deterioration of the iron loss. Therefore, it is necessary that the tension coating film remains on the steel sheet surface.

In the currently available technology, to attain the objectives set forth above, a film comprising a substance having a smaller heat expansion coefficient than the steel sheet is formed. For example, a film mainly composed of forsterite is formed in the so-called final annealing step by reacting oxides on the steel sheet surface with an annealing separator coated thereon, followed by applying a top coat (a tension coating film with a low heat expansion coefficient) as a tension-endowing type insulation film on the forsterite film.

This tension-endowing type insulation film is mostly formed by coating and baking a treatment liquid mainly composed of a phosphate salt of Al and alkali earth metals, colloidal silica and chromic anhydride or chromic acid salts, endowing the steel sheet with a tension at room temperature by taking advantage of the heat expansion difference between the iron substrate and an insulation film such as an inorganic coating film represented by colloidal silica having a smaller coefficient of heat expansion than that of the steel sheet. Representative methods for forming the insulation films are described in the art disclosed, for example, in Japanese Examined Patent Publication Nos. 53-28375 and 56-52117.

However, the foregoing methods have drawbacks caused by the fact that adhesion of the tension-endowing type coating film is poor. In other words, the coating film with a larger tension-endowing effect needs a stronger adhesive force, because this film might be peeled off if the adhesive force of the substrate is not strong enough to hold the coating film when the tension-endowing type coating film is directly applied on the metal substrate without forsterite film as a result of a surface smoothing treatment such as a surface mirror finish, resulting in a very poor adhesive property of the substrate. Consequently, it is a crucial problem to make the technology for magnetically smoothing the surface of the electrical steel sheet compatible with the iron loss reducing technology using a tension-endowing type insulation film. This has become a major problem in the art.

The technologies for magnetically smoothing the surface of the iron substrate of the electrical steel sheet and for endowing the steel sheet with the tension coating film will be summarized hereinafter.

Japanese Examined Patent Publication No. 56-4150 discloses a method for smoothing the steel sheet surface to a mean surface roughness Ra of 0.4 $\mu$m or less by applying chemical polishing or electrolytic polishing, followed by depositing a ceramic thin film thereon. This is done by chemical vapor deposition or vacuum deposition. While a large tension effect can be generated by this method due to the differences of heat expansion coefficients, since the ceramic coating film has a substantially smaller heat expansion coefficient as compared to that of the iron substrate, adhesion between the iron substrate and the coating film becomes quite a problem. Further, this method is not suitable for industrial production owing to slow deposition of the coating film.

Japanese Examined Patent Publication No. 63-54767 discloses a method for forming ceramic films made of, for example, nitrides or carbides by ion plating or ion implantation. Japanese Examined Patent Publication No. 2-243770 discloses directly forming a tension endowing type insulation film on the steel sheet surface by depositing a ceramic coating film, sing a so-called sol-gel method. However, forming the ceramic coating film by deposition as disclosed in Japanese Examined Patent Publication No. 63-54767 requires a high production cost along with being difficult to attain uniform film thickness in mass-treatment of large area films. Although film formation by baking is possible in the sol-gel method according to Japanese Examined Patent Publication No. 2-243770, however, it is difficult to form an intact film with a thickness of 0.5 μm or more, the film lacking the benefit of any large tension-endowing effect. In addition, the film has such poor adhesiveness to the steel sheet that the desired iron loss improvement effect cannot be obtained.

Japanese Unexamined Patent Publication No. 62-103374 discloses a method for depositing a mixed thin film of the iron substrate with a variety of oxides, borates, phosphates and sulfides on a steel sheet surface smoothed by polishing, on which a baked layer of an insulation film is formed. While this method provides excellent adhesion of the steel sheet to the baked layer of insulation film, improvement of magnetic characteristics cannot be realized since the smoothing effect of the steel sheet into a mirror finish is lost due to the presence of the mixed thin layer with the iron substrate.

Japanese Unexamined Patent Publication No. 6-184762 disclosed a method for coating and baking a coating solution or forming a tension endowing coating film after allowing $SiO_2$ to deposit. However, the method for depositing the $SiO_2$ thin film results in such a poor tension effect that the iron loss improvement becomes insufficient.

Japanese Unexamined Patent Publication No. 7-173641 proposes a grain oriented electrical steel sheet provided with a metallic coating film whose linear heat expansion coefficient is decreased to $3\times10^{-6}$ $K^{-1}$ or lower by applying heat treatment on the steel sheet surface. However, little iron loss reduction can be achieved when the interface between the surface of the iron substrate of the steel sheet and the metallic coating film has substantial roughness. Further, it is impossible to obtain the desired effect because the metallic coating film layer is peeled off by the heat treatment when the interface is smooth.

Japanese Unexamined Patent Publication No. 3-294468 discloses forming a silicide coating film with a low pressure plasma deposition after applying a metallic plating on the smoothed surface of the iron substrate. However, the adhesion between the metallic plating film and the plasma deposit silicide film is not sufficient to achieve the desired magnetic characteristics.

The foregoing Japanese Unexamined Patent Publication No. 52-24499 further discloses a method for coating and baking the coating solution to form a tension film by mirror finishing the surface of the iron substrate of the steel sheet, followed by plating a metallic thin film on the sheet. While this process can suppress reduction of magnetization due to degradation of the steel sheet surface, the insulation film after metallic plating is prone to being peeled off by baking or, even if peeling could be avoided, a large degree of iron loss reduction could not be achieved because the insulation film was composed of a non-tension insulation film of an ordinary phosphate origin.

Although an iron loss reduction could be expected if the insulation film is of a tension-endowing type, such means are practically impossible because the coating film has only weak adhesion to the plating surface.

As hitherto described, the trend of technical development for reducing the iron loss of grain oriented electrical steel sheet is directed to the concept of forming a tension coating film after smoothing the surface of the iron substrate of the steel sheet, or after applying a enhancement treatment of crystal grain orientation. However, the tension coating film exerts so strong a tension on the steel sheet surface that the interface between the steel sheet surface and tension coating film suffers a strong shearing stress that naturally tends to peel off the coating film. Consequently, the desired tension is not applied and significant iron loss reduction cannot be attained.

While it may be readily presumed that enhancing the interface roughness between the surface of the iron substrate of the steel sheet and the tension coating film is effective for solving such problems, smoothness of the steel sheet surface is lost by this method and this negates the favorable iron loss characteristics.

Although adhesive properties of the tension coating film are somewhat improved by enhancement treatment of crystal grain orientation as compared with a smoothing treatment, yet the resulting adhesive properties are so far from the desired adhesion that the iron loss cannot be sufficiently reduced, since the desired tension effect is not fully imparted to the steel sheet.

SUMMARY OF THE INVENTION

An object of the present invention is to provide a grain oriented electrical steel sheet endowed with substantial surface tension, and including a steel substrate, a coated or electroplated metallic intermediate layer thereon, and a tension coating film firmly and tenaciously adhered to the metallic layer. It is made by smoothing or treating the steel sheet surface to reduce surface roughness, depositing an intermediate metallic layer with good adhesion on the steel sheet, and by adhering a tension coating film securely and strongly to the metallic layer.

It is another object of this invention to make the technology for magnetically smoothing the surface of the electrical steel sheet compatible with the iron loss reducing technology using a tension-endowing type insulation film.

It is still another object of the present invention to provide strong adhesion of the intermediate plating layer to or into the iron substrate, which is a unique characteristic of a plating process, compatible with adhesion of a tension-endowing type coating film on the intermediate layer.

In the present invention the iron substrate is prepared for electroplating by either (a) smoothing the ferrous surface to reduce the surface roughness of the steel sheet surface or (b) enhancement treatment of crystal grain orientation applied to the substrate, and applying an intermediate plating layer in a manner to form an uneven surface plating layer, followed by adhering the tension coating film on the uneven surface of the intermediate plating layer. It was found that the surface of such a plating layer was rough enough to provide tenacious adhesion with the tension coating film subsequently applied, while concurrently improving the smoothness and magnetic characteristics of the product, significantly lowering its iron loss.

The present invention provides a grain oriented electrical steel sheet that has a very low iron loss and a plating layer adhered between the steel sheet and a tension coating film. The surface of the metal substrate is preliminarily subjected to enhancement treatment of crystal orientation or provided as a smooth surface having a mean roughness of about 0.20 μm or less.

In order to obtain good adhesion as between the plating layer and the tension coating film, it is preferred that the plating layer is grown in such a way that it has a mean surface roughness of about 0.20 μm or more at the interface between the plating layer and the tension coating film.

It is more preferable that these grain oriented electrical steel sheets further satisfy one or more of the following essential conditions:

The plating film is highly preferably deposited upon the ferrous substrate by heterogeneous growth, for important reasons to be developed in further detail hereinafter.

A ceramic layer, at a volume ratio of about 50% or less, may be present in the plating layer.

The surface of the iron substrate of the grain oriented electrical steel sheet may be subjected to a preliminary magnetic domain refining treatment.

The present invention provides a grain oriented electrical steel sheet having excellent adhesion to the tension coating film, and has a very low iron loss. It has an intermediate plating layer on the iron substrate. A tension coating film is deposited on the intermediate plating layer. The surface of the grain oriented electrical steel sheet may be preliminarily subjected to an enhancement treatment of crystal grain orientation, or it is provided with a smooth surface having a mean roughness of about 0.20 μm or less.

It is preferable that the metal in the intermediate plating layer is chromium and/or nickel, or an alloy. It is also preferable that the surface of the iron substrate of the grain oriented electrical steel sheet is preliminarily subjected to a magnetic domain refining treatment.

The present invention also provides a method for producing a grain oriented electrical steel sheet having excellent adhesion to a tension coating film, and having a very low iron loss. It is made by providing an iron substrate of a grain oriented electrical steel sheet in which a secondary recrystallization texture is developed to be aligned to the (110) [001] orientation, subjecting the surface of the substrate to an enhancement treatment of crystal orientation or a smoothing treatment to reduce the mean roughness of the surface to about 0.20 μm or less;

electro depositing an intermediate plating layer on the thus-treated surface to achieve good adhesion with a tension coating film to be applied thereafter; and depositing the tension coating film on the plating layer.

The surface roughness of the metal plating layer is preferably controlled to about 0.20 μm or more by applying a metal plating by causing a plating layer to be heterogeneously grown on and at least partially absorbed into the grain oriented electrical steel sheet substrate.

It is preferable but optional that the metal plating is chromium plating.

It is preferable that the magnetic domain refining treatment is applied during the process of producing the iron substrate of the grain oriented electrical steel sheet.

It is preferable that the metal of the intermediate plating layer is chromium or nickel, or a combination, or an alloy. It is also preferable that amagnetic domain refining treatment has been applied to the substrate during its manufacture.

DESCRIPTION OF THE PREFERRED EMBODIMENT

Figure 1:
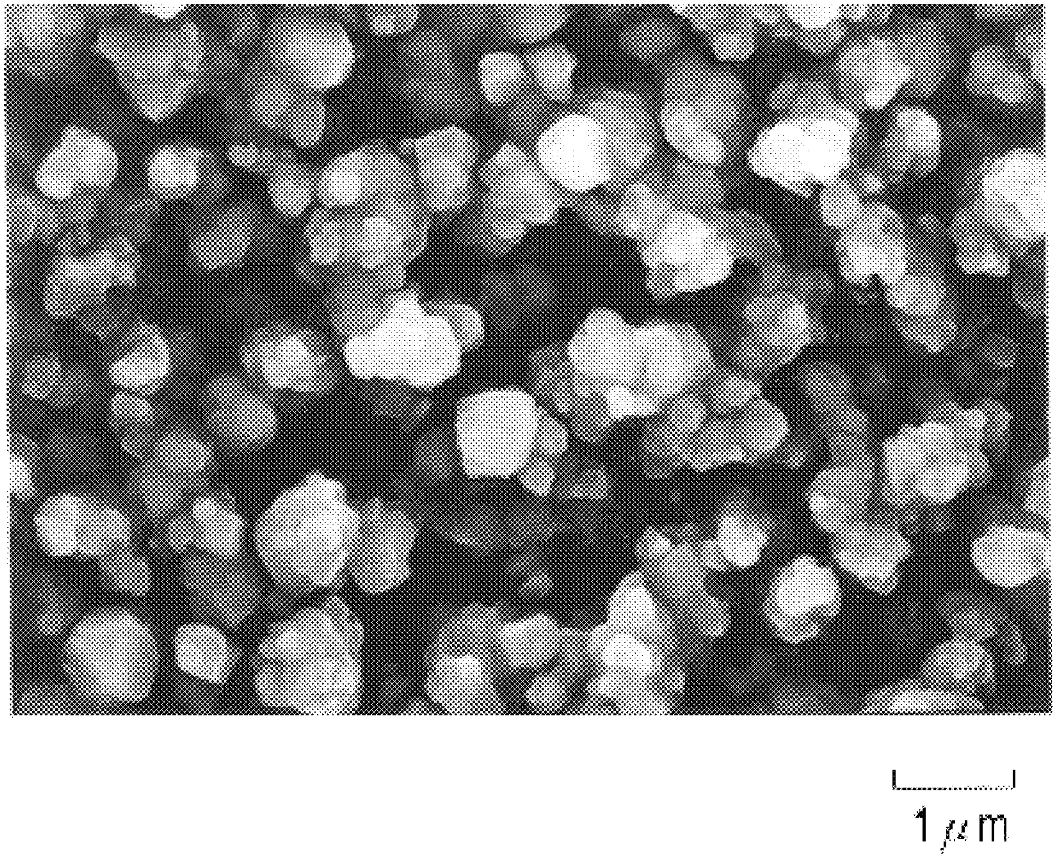
FIG. 1 is a scanning electron microscopic photograph of a plating layer according to the present invention, showing deposition layers of a number of fine metallic chromium particles ascribed to heterogeneous growth.

It is an important feature of the present invention that a plating layer is formed on the surface of an iron substrate of an electrical steel sheet that has previously been subjected to an enhancement treatment of crystal grain orientation or to a smoothing treatment that achieves a mean roughness of about 0.20 μm or less, in order to achieve excellent adhesiveness of the plating layer to the iron substrate and to a subsequently applied tension coating film.

In accordance with one preferable method according to this invention a metallic plating or coating is applied to the substrate in such a way that the plating layer is heterogeneously grown on the surface of the previously treated iron surface substrate, with the tension coating film subsequently deposited thereon.

In accordance with one method according to this invention, as performed by us, a forsterite film of the grain oriented electrical steel sheet, having a thickness of 0.23 mm after completing secondary recrystallization, was removed by acid pickling followed by smoothing the surface with a mixed solution of sulfuric acid and chromic acid to smooth the surface to a mean steel sheet surface roughness of about 0.10 μm.

This steel sheet was divided into three portions identified as sheets 1, 2 and 3, and a tension coating film mainly composed of colloidal silica and magnesium phosphate in 60% to 40% ratios was coated and baked on the first steel sheet directly after applying a smoothing treatment to prepare the steel sheet 1.

Chromium plating was electrolytically applied to the second portion of the steel sheet (sheet 2) with a thickness of 0.6 μm per each surface, at a bath temperature of 55° C. and at a current density of 22 A/dm$^2$ in a Sargent bath, followed by coating and baking a tension coating film (mainly composed of colloidal silica and magnesium phosphate in 60% to 40% ratios) as in the steel sheet 1, to prepare the steel sheet 2.

Chromium plating was also electrolytically applied to the third steel sheet (sheet 3) with a thickness of 0.7 μm per each surface, at a bath temperature of 35° C. and a current density of 45 A/dm$^2$ in a Sargent bath, followed by coating and baking a tension coating film mainly composed of colloidal silica and magnesium phosphate in 60% to 40% ratios as in the steel sheet 1 and steel sheet 2, to prepare the steel sheet 3.

The plating condition used in the production of the steel sheet 2 is a standard condition for obtaining a good plating surface. The mean roughness of the steel sheet surface, immediately after chromium plating, was 0.10 μm.

On the contrary, the plating conditions used in the production step of the steel sheet 3 are conditions that have heretofore been expected to make so-called defective plating. The mean surface roughness of the steel sheet immediately after chromium plating was much greater and measured at 0.45 μm.

Adhesive properties were measured by bending the steel sheets around a series of standard cylinders having decreasing diameters, and recording the lowest diameter cylinders which produced no peel-off as a result of bending the steel sheet around the cylinder. Thus, adhesiveness is sometimes expressed hereinafter as a minimum peel-off bending diameter.

The magnetic characteristics of the steel sheet were measured. The following results were obtained:

| | Minimum peel-off bending diameter | $B_8$ | Iron loss $W_{17/50}$ |
|---|---|---|---|
| Steel sheet 1 | 160 mm | 1.962T | 1.10 W/kg |
| Steel sheet 2 | 60 | 1.964T | 0.98 |
| Steel sheet 3 | 20 | 1.965T | 0.63 |

The results show that the steel sheet 3 had surprisingly good adhesive properties as well as a very low iron loss.

To clarify why these results were obtained, the plating layers were examined in detail. In sheet 2 the chromium layer was evenly grown, and the roughness of the interface between the plating surface and the tension surface was small. This is believed to have occurred because the plating surface assumed a smooth surface in producing the steel sheet 2. On the contrary, in producing the steel sheet 3, the chromium plating layer was composed of a deposit layer of a large number of fine metallic chromium particles owing to the heterogeneous growth of the chromium plating layer, as shown in FIG. 1 of the drawings, which is a scanning electron microscopic photograph of the plating layer surface. FIG. 1 indicates that the surface of the chromium plating layer was very uneven, resulting in extremely great roughness of the interface between the plating layer and the subsequently applied tension layer. In addition, many fine holes were observed in the plating layer.

Reasons for the surprisingly good adhesive properties of the tension coating film on the steel sheet 3 include the increased surface roughness of the plating layer and the presence of many well-distributed tiny holes in the plating layer for penetration by the tension coating film. It is believed that the subsequently applied tension coating film penetrates into these holes to tightly bind the plating layer to the tension coating film.

If the roughness of the steel sheet were merely increased by roughening the steel in an effort to enhance adhesion of the tension coating film, the iron loss of the steel sheet would substantially deteriorate owing to hindrance of movement of the magnetic domain wall. However, when the plating layer is applied by heterogeneous growth as described above, the iron loss of the substrate does not deteriorate but is radically and significantly improved, even though the roughness of the plating layer itself is increased.

The results as described above are novel results discovered by us. They are unexpected effects, considering that the plating layer is composed of metals as in the steel substrate. These remarkable effects are presumed to be caused by a strong tension-endowing function of the tension coating film penetrating into the roughness of the plating layer, in contrast to the small magnetic effect applied to the plating layer.

The original concept of the present invention surprisingly involves plating under "heterogeneous growth" conditions that have heretofore been considered in the art to be the worst conditions for plating. In contrast, we have gained great advantage in using the conditions of the heterogeneous growth region.

Figure 2:
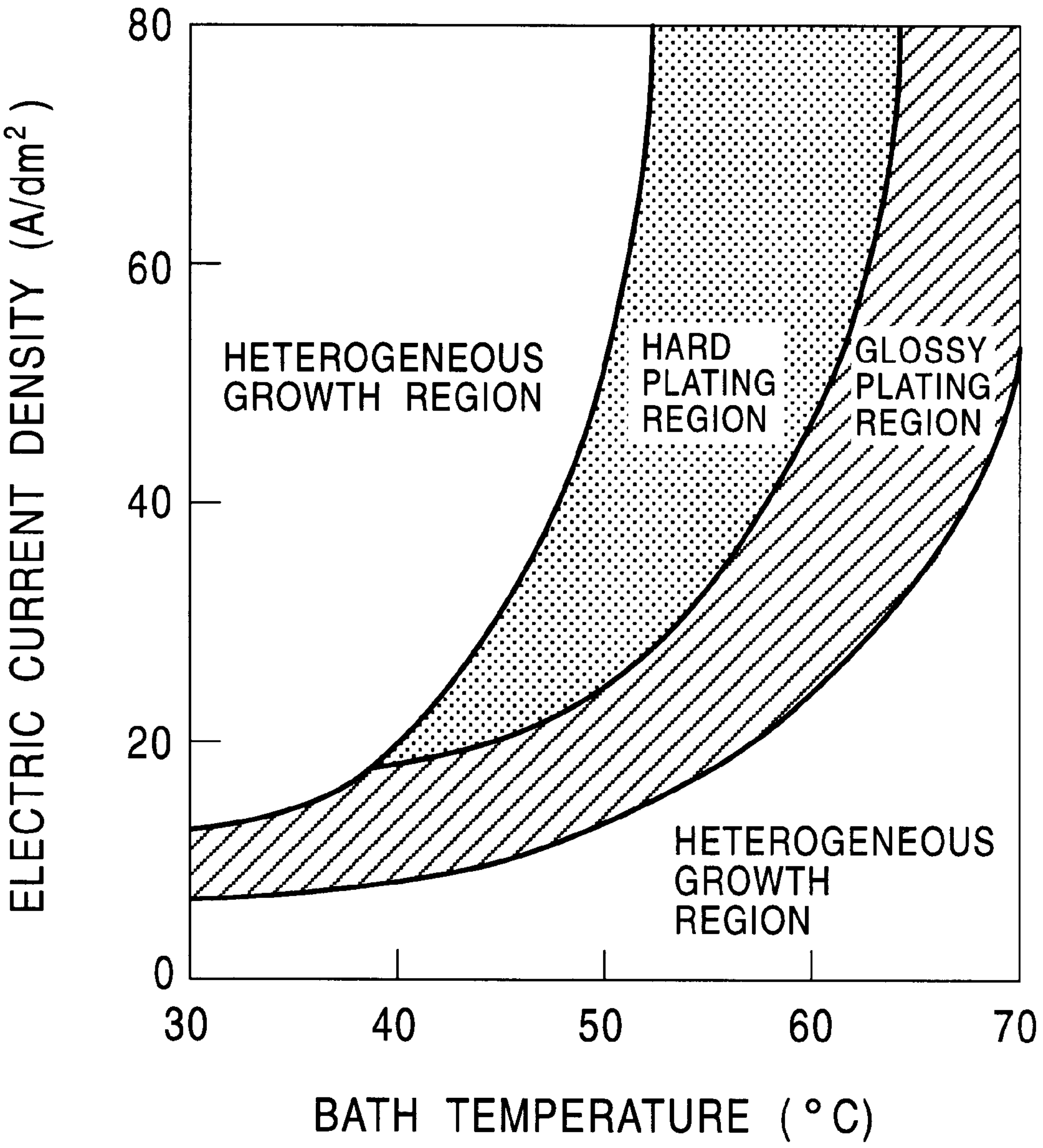
FIG. 2 is a graph in accordance with this invention showing relationships between the plating bath temperature and the plating current density during the intermediate plating operation.

The term "heterogeneous growth region" as used herein refers to a temperature-density relationship or region where the bath temperature and current density are outside of the range that is effective for obtaining a glossy plating or a hard plating. The relationship can change on the metal ion content of the bath and, for instance, is shown in FIG. 2 of the drawings. These are referred to with respect to the Sargent bath used for chromium electroplating. We have discovered surprising advantage by plating while operating at temperature-current density parameters that lie substantially within the heterogeneous growth region, contradictory to the previously accepted practice, when the plating layer is blended and joined with a substrate grown in accordance with the present invention.

The method of this invention causes the surface roughness of the exposed plating layer to be enhanced, enabling strong adhesive properties with the subsequently applied tension coating, and enhancing the tension-endowing effect of the tension coating film, thereby permitting achievement of a remarkable iron loss reduction after subsequently applying the tension coating film on the porous plating layer.

Electroplating within the heterogeneous growth region may be, but is not necessarily, applied throughout all the plating steps, as shown in the Example 3 to be described hereinafter, but may be applied to only a part of the process. The timing for causing the heterogeneous growth to occur may be at any time of the initial, midterm or final plating step. In other words, plating within the heterogeneous growth region may be carried out during at least a part of the total plating procedure.

The profile of the outer surface of the plating layer is important for realizing the benefits of the present invention. It is preferable to adjust the mean roughness of the plating layer to about 0.20 μm or more. When that value is less than about 0.20 μm, adhesion between the plating layer and the subsequently applied tension coating film formed thereon may be insufficient in some cases.

However, the plating conditions are not necessarily limited to the use of chromium or nickel. Rather, the conditions such as the kind of plating metal, the kind of the plating bath, the concentrations of the plating metal ions and the current density for plating may be widely and appropriately selected.

While the preferred plating metals include Cr, Ni, Sn and Zn, Cr is advantageous for exhibiting the strongest effect, along with providing the widest range in which heterogeneous growth can be achieved. Though a second phase such as a ceramic may be dispersed in the metallic plating layer, if desired, it is preferable to keep the volume ratio of the second phase below about 50% by volume. When the ratio is about 50% or more, the metal tends to be weakened to deteriorate the adhesive properties with the steel surface, and to interfere with the electromagnetic continuity, thereby possibly degrading the magnetic characteristics of the product.

While the present invention is characterized broadly by applying a metallic plating on the steel sheet surface within the heterogeneous growth region, the following conditions should generally be observed in practicing the present invention.

It is desirable that raw materials of the slab for producing the grain oriented electrorical steel sheet contain about 1.5 to 7.0% of Si and about 0.03 to 2.5% of Mn (weight ratio). While Si and Mn are effective components for enhancing the electric resistance and reducing the iron loss of the steel, hardness of the material becomes high and makes production and processing rather difficult when the Si content exceeds about 7.0% by weight. When the Mn content exceeds about 2.5% by weight, γ-transformation is induced during heat treatment, to possibly degrade the magnetic characteristics of the product.

Inhibitor components such as S, Se, Al, B, Bi, Sb, Mo, Te, Sn, P, Ge, As, Nb, Cr, Ti, Cu, Pb, Zn and In may be present alone or in combination, in addition to the foregoing elements.

Although C, S and N play an important role in allowing the secondary recrystallization texture to be formed during the production process of the electrical steel sheet and are possibly contained in the raw material, they may exert some harmful influences on the magnetic characteristics of the product, especially allowing the iron loss to be degraded. Accordingly, these elements should be limited in the steel sheet in the range of C about 0.003% or less, S content of about 0.002% or less and N of about 0.002% or less (each in % by weight) in the steel sheet by steps including decarburization annealing and purification annealing.

The raw material slab for making the grain oriented electrical steel sheet having the composition as described above is subjected to slab reheating, hot rolling, hot rolled sheet annealing, primary recrystallization annealing combined with decarburization, secondary recrystallization and final annealing for purification—all by methods known in the art. Although selection of these steps is not a part of the present invention, relevant steps for sufficiently enhancing the degree of accumulation to the (110) [001] orientation should be selected. However, the plating effect in the heterogeneous growth region according to the present invention is not always utilized in a grain oriented electrical steel sheet having a high magnetic flux density, but can be utilized in a grain oriented electrical steel sheet produced by conventional production processes. Accordingly, the present invention can even be applied to usual grain oriented electrical steel sheets.

It is also possible in the secondary recrystallization annealing to form a so-called glass film (a forsterite film) by using an annealing separator mainly containing magnesia, or to produce an electrical steel sheets having no film by using alumina as an annealing separator.

The grain oriented electrical steel sheet obtained by the foregoing process has a magnetically smooth surface along with being finished so as to be amenable to metallic plating. The method should not be especially limited. However, in general, removal of a forsterite film by pickling, or applying a mirror finish by thermal etching or chemical polishing, maybe properly applied. When an oxidation film is present on the grain oriented electrical steel sheet after completing secondary recrystallization, or when the smoothness of the steel sheet surface is damaged, the smoothing treatment is further continued after removing the oxides. The smoothing treatment and removal of the oxide film may be simultaneously carried out to reduce production cost. It is preferable that the mean roughness of the steel sheet is reduced to about 0.20 $\mu$m or less by the smoothing treatment, since degradation of magnetic characteristics may be caused when roughness exceeding about 0.20 $\mu$m remains on the surface.

An enhancement treatment of crystal grain orientation may be applied instead of the smoothing treatment heretofore described. An aqueous solution of NaCl, KCl or $NH_4Cl$ is conveniently used for this treatment for the purpose of electrolysis of the steel sheet surface in the presence of Cl ions. This treatment allows crystal grains to remain, such grains having a magnetically preferable crystal plane such as the (110) plane, and accelerates electrolytic erosion of crystal grains having a magnetically undesirable crystal plane, thereby improving the overall magnetic characteristics. The surface roughness of the steel sheet is not substantially reduced by this treatment, rather enhancing adhesion of the electroplating layer formed thereon, by creating steps at grain boundaries of the steel sheet surface. It is preferable to make steps having a height of about 0.1 $\mu$m or more (mean value).

The electrodeposition speed, which is dependent on the plane of the secondary crystal grain recrystallization on the surface of the steel substrate, can be caused to become constant by providing the (110) plane of a crystal on the steel surface. The crystals provide improved adhesive properties due to a somewhat increased surface roughness. It differs from a mirror face, especially because of the grain-like plane obtained by the enhancement treatment of crystal grain orientation, in which the aforementioned steps or terraces are formed in the Fe—Si (110) plane, alternately aligned with each other. Accordingly, the characteristics of the electroplating film are stabilized, since there is no dispersion of the binding force that affects the thickness and adhesion of the electrodeposited layer, thereby endowing the substrate with extremely excellent surface characteristics allowing it to be subjected to rapid, tenacious and uniform plating according to the present invention.

It is advantageous for reducing production cost that the smoothing treatment and elimination of the oxide film on the steel sheet surface can be simultaneously applied.

The method for forming a smooth surface in the present invention comprises not only a smoothing treatment such as chemical polishing or electrolytic polishing but also the method in which the forsterite film and oxide film is substantially inhibited from being formed in the secondary recrystallization annealing.

A metallic plating is applied by the foregoing method on the surface of the electrical steel sheet having a smoothed surface or on a surface subjected to preliminary enhancement treatment of crystal grain orientation. A steel sheet having a metallic plating layer, at least a part of which has been heterogeneously grown, is preferably obtained, to which a tension coating film is subsequently applied.

Any known or suitable tension coating films are acceptable for use in accordance with this invention so far as they possess the requisite insulating properties and tension-endowing functions. For example, phosphate-colloidal silica-chromic acid based coating films that have been used for grain oriented electrical steel sheets having a forsterite film are advantageous in view of their surface tensioning effect, production cost and treatment uniformity. Coating films prepared by mixing colloidal silica in various kinds of phosphates, coatings of aluminum borate or ceramic coating films such as TiN, BN and $Al_2O_3$ are available.

A tension coating film thickness in the range of about 0.3 to 10 $\mu$m is preferable in view of the tension endowing effect, lamination factor and adhesion of the coating film. Oxide films such as borate—alumina proposed in, for example, Japanese Unexamined Patent Publication Nos. 6-65754, 6-65755 and 6-299366 may be applicable, along with those hitherto described.

The technology of the magnetic domain refining treatment may be used together with the process of this invention, to greatly improve magnetic characteristics, in practicing the present invention. Examples of magnetic domain refining treatments include conventional methods for providing locally strained regions by irradiating the steel sheet surface with a laser or plasma jet, providing grooves on the steel sheet surface, locally altering the texture of the steel sheet surface, and altering a part of the coating film. Use of a so-called protrude roll or an etching method is also applicable.

The timing for applying the magnetic domain refining treatment may be any time along the process of production of the electrical steel sheet, including the time when the iron loss reducing effect is displayed by the magnetic domain refining treatment.

EXPERIMENTAL RESULTS

Example 1

A slab containing 3.35% of Si, 0.07% of Mn, 0.03% of Sb and 0.01% of Mo with the balance Fe and incidental impurities was subjected to hot rolling and cold rolling followed by decarburization annealing to obtain a decarburization annealed sheet having a thickness of 0.22 mm. This decarburization annealed sheet had grooves having a depth of 20 μm, a width of 2 mm and a repeating distance of 2 mm along the rolling direction.

An annealing separator of a film formation suppressing type comprising 30% of CaO, 25% of $Al_2O_3$, 25% of MgO and 20% of $SiO_2$ was coated on the decarburization annealed sheet. The sheet was wound into a coil and subjected to final annealing at 1200° C. for 5 hours to obtain a grain oriented electrical steel sheet. Secondary recrystallization and purification treatment applied to the steel sheet was satisfactory with few residues of oxides on the surface.

The electrical steel sheet obtained was mildly pickled with an aqueous solution containing 5% of HCl to completely remove the oxides remaining on the surface. Then, the steel sheet surface was smoothed to a mean roughness of about 0.1 μm by passing the sheet through a bichromic acid and sulfuric acid mixed acid. The steel sheet obtained was divided into four coils a, b, c and d and subjected to the following treatment.

Coil a:

The coil was plated in a plating bath containing 2.5 N concentration of Cr ion under a current density of 55 A/dm$^2$, abath temperature of 40° C. and a plating time of 30 seconds. This was within the heterogeneous growth region of FIG. 2, forming a plating layer with a thickness of about 2 μm per steel surface and a mean roughness of 0.35 μm (Example of the present invention).

Coil b:

The coil was plated in a plating bath containing 0.7 N concentration of Cr ion under a current density of 28 A/dm$^2$, abath temperature of 55° C. and a plating time of 2minutes. This was outside the heterogeneous growth region of FIG. 2, forming a hard or glossy plating layer with a thickness of about 2 μm per steel surface and a mean roughness of 0.08 μm (Comparative Example).

Coil c:

The coil was plated with copper in a plating bath containing 0.3 N concentration of Cu ion under a current density of 22 A/dm$^2$, a bath temperature of 35° C. and a plating time of 10 seconds, forming a plating layer with a thickness of about 1.1 μm per one steel surface and a mean roughness of 0.12 μm (Comparative Example).

Coil d:

A treating solution prepared by dispersing alumina sol in a borate solution was directly coated and baked at 700° C. on the surface of the steel sheet immediately after a smoothing treatment, forming an aluminum borate coating film with a thickness of 1.5 μm and a mean roughness of 0.05 μm (Comparative example)

A solution of magnesium phosphate containing 60% of colloidal silica was coated on these coils and tension coating films were applied and baked at 800° C. to produce final products.

The results of measurement of the magnetic characteristics, adhesive properties of the coating film and interlaminar resistance on each product are shown in TABLE 1.

TABLE 1

| Symbol | Kind of plating etc | Surface roughness of plating layer Mean roughness (μm) | Magnetic characteristics $B_8$ (T) | Magnetic characteristics $W_{17/50}$ (W/kg) | Property of coating film Adhesion* (mm) | Property of coating film Interlaminar resistance (μΩ/cm/sheet) | Note |
|---|---|---|---|---|---|---|---|
| a | Metallic chromium | 0.35 | 1.918 | 0.643 | 20 | 200 | Example of this invention |
| b | Metallic chromium | 0.08 | 1.918 | 0.945 | peeled off | 0.5 | Comparative example |
| c | Metallic copper | 0.12 | 1.917 | 0.876 | peeled off | 0.3 | Comparative example |
| d | Aluminum borate | 0.05 | 1.918 | 0.854 | 55 | 150 | Comparative example |

*The minimum bend diameter where no peel-off of the coating film occurred.

Example 2

A silicon steel slab containing 3.40% of Si, 0.07% of Mn, 0.02% of Al, 0.15% of Cu, 0.04% of Sb and 0.02% of Se with a balance of Fe and incidental impurities was treated to obtain a cold-rolling sheet followed by a decarburization annealing to obtain a decarburization annealed sheet having a thickness of 0.18 mm. An annealing separator comprising 90% of MgO, 8% of $TiO_2$, and 2% of $Sr(OH)_2$ was coated on the decarburization annealed sheet. The sheet was wounded into a coil and subjected to final annealing at 1150° C. for 5 hours to obtain a grain oriented electrical steel sheet. The steel sheet had a well-purified secondary recrystallization texture and a forsterite film formed on its surface.

After removing the surface forsterite film by grinding, an enhancement treatment of crystal grain orientation was applied by electrolysis in an aqueous solution of 15% NaCl. The steel sheet obtained was divided into four coils identified as e, f, g, h, i and j and subjected to the following treatment.

Coil e:

The coil was plated with chromium under a current density of 60 A/dm$^2$, a bath temperature of 35° C. and a plating time of 8 seconds using a plating bath containing 5.3 N of Cr ion, forming a plating layer on each steel sheet surface with a thickness of 0.4 μm and a mean roughness of 0.24 μm (Example of the present invention).

Coil f:

The coil was plated with chromium under a current density of 38 A/dm$^2$, a bath temperature of 25° C. and a plating time of 25 minutes using a plating bath containing 2.7 N of Cr ion with suspended colloidal silica with a dimension of 0.2 μm, forming a plating layer containing 30% of silica in metallic Cr on each steel sheet surface with a thickness of 0.52 $\mu$m and a mean roughness of 0.36 $\mu$m (Example of the present invention).

Coil g:

The coil was plated with copper under a plating condition of a current density of 52 A/dm$^2$, a bath temperature of 25° C. and a plating time of 45 seconds using a plating bath containing 4.3 N of Cu ion, forming a plating layer on each steel sheet surface with a thickness of 0.7 $\mu$m and a mean roughness of 0.26 $\mu$m (Example of the present invention).

Coil h:

The coil was plated with zinc under a current density of 32 A/dm$^2$, a bath temperature of 20° C. and a plating time of 15 seconds using a plating bath containing 4.6 N of Zn ion with suspended colloidal silica with a dimension of 0.1 $\mu$m, forming a plating layer containing 20% of silica in zinc on each steel sheet surface with a thickness of 0.7 $\mu$m and a mean roughness of 0.38 $\mu$m (Example of the present invention).

Coils h and j:

The coils were plated with nickel under a current density of 38 A/dm$^2$, a bath temperature of 23° C. and a plating time of 25 seconds using a plating bath containing 2.6 N of Ni ion, forming a plating layer on each steel sheet surface with a thickness of 0.9 $\mu$m and a mean roughness of 0.28 $\mu$m (Example of the present invention).

The plated coils obtained as described above were coated with a magnesium phosphate solution containing 50% of colloidal silica and baked at a temperature of 850° C. to apply a tension coating. Of these coils, five coils e, f, g, h and i were linearly irradiated with a space of 7 mm for subjecting the coils to a magnetic domain refining treatment.

The results of measurements of magnetic characteristics, surface property, adhesive property of the coating film and interlaminar resistance are listed in TABLE 2.

separator of the film formation suppressing type comprising 30% of MgO, 25% of CaO, 25% of $SiO_2$, and 20% of $Al_2O_3$. The sheet was wound into a coil and subjected to final annealing at 1200° C. for 5 hours. Secondary recrystallization and purification treatment were satisfactory in this steel sheet, obtaining a grain oriented electrical steel sheet with only a few oxides on the steel sheet surface.

After subjecting the resulting coil to an enhancement treatment of crystal grain orientation by electrolysis in an aqueous solution of 15% NaCl, the coil was divided into 6 coil parts identified as k, l, m, n, o and p, to subject them to the following treatments.

Coil k:

The coil was plated with chromium in a Sargent bath using a heterogeneous growth condition of a current density of 51 A/dm$^2$ and a bath temperature of 35° C. for 50 seconds, forming a chromium plating layer with a thickness of about 1.2 $\mu$m per surface of the steel sheet and a mean roughness of 0.33 $\mu$m (Example of the present invention).

Coil l:

After plating with chromium in a Sargent bath under a homogeneous growth condition of a current density of 28 A/dm$^2$ and a bath temperature of 50° C. for 40 seconds, the coil was further plated with chromium under a heterogeneous growth condition of a current density of 60 A/dm$^2$ and a bath temperature of 40° C. for 10 seconds, forming a chromium plating layer with a thickness of about 1.4 $\mu$m per one surface of the steel sheet and a mean roughness of 0.31 $\mu$m (Example of the present invention).

Coil m:

After plating with chromium in a Sargent bath under a homogeneous growth condition of a current density of 28 A/dm$^2$ and a bath temperature of 50° C. for 30 seconds, the coil was further plated with chromium under a heterogeneous growth condition of a current density of 60 A/dm$^2$ and

TABLE 2

| Symbol | Kind of plating, etc | Surface roughness of plating layer Mean roughness ($\mu$m) | Magnetic characteristics $B_8$ (T) | Magnetic characteristics $W_{17/50}$ (W/kg) | Property of coating film Adhesion* (mm) | Property of coating film Interlaminar resistance ($\mu\Omega$/cm/sheet) | Note |
|---|---|---|---|---|---|---|---|
| e | Metallic chromium | 0.24 | 1.952 | 0.621 | 20 | 220 | Example of this invention |
| f | Metallic chromium + 30% silica | 0.36 | 1.956 | 0.615 | 20 | 225 | Example of this invention |
| g | Metallic copper | 0.26 | 1.948 | 0.632 | 25 | 195 | Example of this invention |
| h | Metallic zinc + 20% alumina | 0.38 | 1.951 | 0.618 | 25 | 205 | Example of this invention |
| i | Metallic nickel | 0.28 | 1.954 | 0.629 | 25 | 210 | Example of this invention |
| j | Metallic nickel | 0.28 | 1.954 | 0.636 | 25 | 210 | Example of this invention |

*The minimum bend diameter where no peel-off of the coating film occurred.

Example 3

A slab containing 3.45% of Si, 0.07% of Mn, 0.02% of Al, 0.15% of Cu, 0.04% of Sb, 0.02% of Se, 0.2% of Ni and 0.015% of Bi with a balance of Fe and incidental impurities was treated in the usual way to obtain a decarburization annealed sheet having a thickness of 0.16 mm. The decarburization annealed sheet was coated with an annealing a bath temperature of 40° C. for 10 seconds. The coil was additionally plated with chromium under a homogeneous growth condition of a current density of 30 A/dm$^2$ and a bath temperature of 55° C. for 10 seconds, forming a chromium plating layer having a thickness of about 1.5 $\mu$m per surface of the steel sheet, and a mean roughness of 0.30 $\mu$m (Example of the present invention).

Coil n:

After plating with chromium in a Sargent bath under a heterogeneous growth condition of a current density of 60 A/dm$^2$ and a bath temperature of 40° C. for 5 seconds, the coil was further plated with chromium under a homogeneous growth condition of a current density of 25 A/dm$^2$ and a bath temperature of 40° C. for 5 seconds, followed by plating with chromium under a heterogeneous growth condition of a current density of 60 A/dm$^2$ and a bath temperature of 40° C. for 5 seconds, forming a chromium plating layer with a thickness of about 1.3 μm per surface of the steel sheet and a mean roughness of 0.32 μm (Example of the present invention).

Coil o:

After plating with chromium in a Sargent bath under a homogeneous growth condition of a current density of 25 A/dm$^2$ and a bath temperature of 50° C. for 40 seconds, the coil was further plated with chromium under a heterogeneous growth condition of a current density of 60 A/dm$^2$ and a bath temperature of 400° C. for 10 seconds, forming a chromium plating layer with a thickness of about 1.3 μm per surface of the steel sheet and a mean roughness of 0.31 μm (Example of the present invention).

Coil p:

The coil was plated with chromium in a Sargent bath under a homogeneous growth condition of a current density of 25 A/dm$^2$ and a bath temperature of 50° C. for 50 seconds, forming a chromium plating layer with a thickness of about 1.2 μm per one surface of the steel sheet and a mean roughness of 0.07 μm (Comparative example).

A solution of magnesium phosphate containing 65% of colloidal silica was coated on each coil obtained by the foregoing treatments and final products were obtained by applying a tension coating and by baking at 850° C.

The magnetic characteristics, surface properties, adhesive properties of the coating film and interlaminar resistance of the final products are listed in TABLE 3.

What is claimed is:

1. A grain oriented electrical steel sheet having a very low iron loss comprising (A) a crystal grain oriented ferrous substrate comprising electrical steel substrate having a special surface selected from the group consisting of (a) a surface having a structure of enhanced crystal orientation of the (100) [001] and (b) a surface having reduced surface roughness, (B) a plating layer adhered to said surface of said substrate, and (C) a tension coating film strongly adhered to said plating layer.

2. A grain oriented electrical steel sheet according to claim 1, wherein the roughness of said plating layer is a mean roughness of about 0.20 μm or more at the interface between said plating layer and said tension coating film.

3. A grain oriented electrical steel sheet according to claim 2, wherein said plating film is deposited on said substrate surface and is roughened by heterogeneous growth on said substrate (A).

4. A grain oriented electrical steel sheet according to claim 2, wherein said plating layer (B) is a chromium electroplating layer.

5. A grain oriented electrical steel sheet according to claim 2, wherein a ceramic layer is present in said plating layer (B) at a volume ratio of about 50% or less based upon the total layer.

6. A grain oriented electrical steel sheet according to claim 2, wherein the surface of said substrate (A) of said grain oriented electrical steel sheet comprises a multiplicity of surface steps, said steps having a height of at least about 0.1 μm.

7. A method for producing a grain oriented electrical silicon steel sheet having excellent coating film adhesive properties and having a very low iron loss, comprising the steps of:

TABLE 3

| Symbol | Kind of plating etc | Surface roughness of plating layer Mean roughness (μm) | Magnetic characteristics $B_8$ (T) | $W_{17/50}$ (W/kg) | Property of coating film Adhesion* (mm) | Interlaminar resistance (μΩ/cm/sheet) | Note |
|---|---|---|---|---|---|---|---|
| k | Metallic chromium | 0.33 | 1.956 | 0.598 | 20 | 230 | Example of this invention |
| l | Metallic chromium | 0.31 | 1.967 | 0.596 | 20 | 220 | Example of this invention |
| m | Metallic chromium | 0.30 | 1.964 | 0.596 | 20 | 230 | Example of this invention |
| n | Metallic chromium | 0.32 | 1.968 | 0.597 | 20 | 220 | Example of this invention |
| o | Metallic chromium | 0.31 | 1.967 | 0.596 | 20 | 220 | Example of this invention |
| p | Metallic chromium | 0.07 | 1.966 | 0.869 | peel off | 0.5 | Comparative example |

*The minimum bend diameter where no peel-off of the coating film occurred.

The present invention creates an insulation film that can provide a strong tension force by coating on a steel sheet subjected to an enhancement treatment of crystal grain orientation, or smoothing treatment with enhanced adhesion, thereby providing a superior grain oriented electrical steel sheet having excellent iron loss and insulation properties.

providing an iron substrate of a grain oriented electrical steel sheet having a secondary recrystallization texture almost aligned to the (110) [001] orientation;

subjecting the surface of said iron substrate to a process selected from the group consisting of (a) an enhancement treatment of crystal grain orientation and (b)

reducing the mean surface roughness of said iron substrate to about 0.20 μm or less;

electrodepositing a plating layer on said surface of said iron substrate to provide a surface having strong adhesive roughness receptive to a tension coating film to be applied thereafter; and depositing said tension coating film on said plating layer with strong adhesion.

8. A method for producing from an iron substrate a grain oriented electromagnetic steel sheet having excellent adhesive properties and a very low iron loss, comprising:

smoothing the surface roughness of said substrate to about 0.20 μm or less, applying to said surface by electrolytic deposition a metal plating layer under conditions which cause said plating layer to grow heterogeneously upon said substrate in forming said plating layer, and adhering a tension coating film to the outside surface of said plating layer.

9. A method according to claim 8, wherein said metal plating is chromium plating.

10. A method according to claim 8 or claim 9, wherein the surface of said iron substrate is a grain oriented electrical steel sheet provided with magnetic domain refining by applying a grain refining treatment.

11. The grain oriented electrical steel sheet defined in claim 1, wherein said tension coating film has a thickness of about 0.3 to 10 μm.

12. The grain oriented electrical steel sheet defined in claim 1, wherein said plating layer is electroplated upon said ferrous substrate.

13. The grain oriented electrical steel sheet defined in claim 1, wherein said metal plating layer is selected from the group consisting of Cr, Ni, Sn and Zn, their alloys and oxides.

14. The grain oriented electrical steel sheet defined in claim 1, wherein said plating layer has an outer surface roughness of about 20 μm or more.

15. The grain oriented electrical steel sheet defined in claim 1, wherein said steel sheet is produced from a slab comprising by weight about Si 1.5–7.0%, Mn about 0.03–2.5%, C 0.003% or less, S about 0.002% or less, N about 0.002% or less and the balance optional inhibitors, Fe and incidental impurities.

16. The grain oriented electrical steel sheet defined in claim 1, wherein said substrate surface is polished by salt electrolysis in the presence of chloride ions to produce a crystal grain oriented substrate surface.

17. The grain oriented electrical steel sheet defined in claim 1, wherein said substrate surface (a) is produced by electro polishing to a smooth surface having a surface roughness of about 0.20 μm or less.

18. The method defined in either of claim 7 or 8, wherein said electrodepositing step is conducted in an electrolytic bath, with combined bath temperature and electric current density substantially within the heterogeneous growth regions of the deposition material as shown in FIG. 2 of the drawings.

* * * * *

UNITED STATES PATENT AND TRADEMARK OFFICE

CERTIFICATE OF CORRECTION

PATENT NO.: 6,136,456
DATED: October 24, 2000
INVENTOR(S): Komatsubara et al

It is certified that error appears in the above-identified patent and that said Letters Patent is hereby corrected as shown below:

In column 5, at line 57, please change "amagnetic: to --a magnetic--.

In column 15, at line 20, please change "400°C." to --40°C.--.

Signed and Sealed this

Eighth Day of May, 2001

Attest:

Nicholas P. Godici

NICHOLAS P. GODICI

Attesting Officer

*Acting Director of the United States Patent and Trademark Office*